United States Patent
Twyman et al.

(10) Patent No.: US 10,353,972 B2
(45) Date of Patent: Jul. 16, 2019

(54) SYSTEMS AND METHODS FOR PROVIDING TIMELY AND RELEVANT SOCIAL MEDIA UPDATES FOR A PERSON OF INTEREST IN A MEDIA ASSET WHO IS UNKNOWN SIMULTANEOUSLY WITH THE MEDIA ASSET

(71) Applicant: Rovi Guides, Inc., San Carlos, CA (US)

(72) Inventors: Damares Helena Twyman, Philadelphia, PA (US); Mariana Bonome Pereira Updegrove, King of Prussia, PA (US); Krista Eve Wells Ramirez, Ardmore, PA (US)

(73) Assignee: Rovi Guides, Inc., San Jose, CA (US)

( * ) Notice: Subject to any disclaimer, the term of this patent is extended or adjusted under 35 U.S.C. 154(b) by 456 days.

(21) Appl. No.: 15/165,133

(22) Filed: May 26, 2016

(65) Prior Publication Data

US 2017/0344648 A1 Nov. 30, 2017

(51) Int. Cl.
| | | |
|---|---|---|
| G06F 17/30 | (2006.01) | |
| G06F 16/9535 | (2019.01) | |
| H04L 29/08 | (2006.01) | |
| H04L 12/58 | (2006.01) | |
| G06K 9/00 | (2006.01) | |
| G06F 16/78 | (2019.01) | |
| G06F 17/27 | (2006.01) | |
| G06Q 50/00 | (2012.01) | |

(52) U.S. Cl.
CPC ...... G06F 16/9535 (2019.01); G06F 16/7867 (2019.01); G06K 9/00288 (2013.01); H04L 51/32 (2013.01); H04L 67/306 (2013.01); G06F 17/278 (2013.01); G06Q 50/01 (2013.01)

(58) Field of Classification Search
CPC .................................................. G06F 17/30256
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,761,892 B2 | 7/2010 | Ellis et al. | |

(Continued)

FOREIGN PATENT DOCUMENTS

EP 3 089 055 11/2016

*Primary Examiner* — Hung Q Pham
(74) *Attorney, Agent, or Firm* — Haley Guiliano LLP

(57) ABSTRACT

Systems and methods are described herein for detecting that a person of interest is displayed in a live video for a threshold amount of time, attempting to identify an identity of the person determining that the attempting has failed, identifying broadcast times corresponding to a period of time in which the person was displayed in the live video, identifying trending topics in a social media space that relate to the live video, ascertaining an identity of the person of interest based on the trending topics, comparing the identity of the person of interest to a database of social media profiles, identifying a social media component that corresponds to the person, determining whether the person has modified the social media component within a predefined period of time, and providing information relating to a modification of the social media component simultaneously with the video.

20 Claims, 8 Drawing Sheets

(56) References Cited

U.S. PATENT DOCUMENTS

| | | |
|---|---|---|
| 7,916,894 B1 | 3/2011 | Dhillon et al. |
| 8,046,801 B2 | 10/2011 | Ellis et al. |
| 8,649,573 B1 | 1/2014 | Darbari et al. |
| 8,753,185 B1 | 6/2014 | Klappert et al. |
| 2002/0174430 A1 | 11/2002 | Ellis et al. |
| 2003/0107592 A1 | 6/2003 | Li et al. |
| 2005/0251827 A1 | 11/2005 | Ellis et al. |
| 2008/0228577 A1 | 9/2008 | Decre et al. |
| 2009/0141949 A1* | 6/2009 | Lee .................... G06K 9/00288 382/118 |
| 2010/0153885 A1 | 6/2010 | Yates |
| 2012/0201472 A1 | 8/2012 | Blanchflower et al. |
| 2013/0141645 A1 | 6/2013 | Barnes et al. |
| 2015/0201243 A1 | 7/2015 | Foote et al. |
| 2016/0187139 A1 | 6/2016 | Agulnik et al. |
| 2016/0277802 A1* | 9/2016 | Bernstein ............ H04N 21/4788 |
| 2016/0371534 A1* | 12/2016 | Koul ........................ G06K 9/00 |
| 2017/0104957 A1* | 4/2017 | Farrell .................. H04L 65/403 |

* cited by examiner

SYSTEMS AND METHODS FOR PROVIDING TIMELY AND RELEVANT SOCIAL MEDIA UPDATES FOR A PERSON OF INTEREST IN A MEDIA ASSET WHO IS UNKNOWN SIMULTANEOUSLY WITH THE MEDIA ASSET

BACKGROUND

The prevalence of social media as a supplemental source for information, such as news, commentary, and the like, has grown in recent years. Related art systems and methods describe supplementing media viewed on various devices, such as a television, with social media. This information, however, is often not timely and is not relevant to a portion of a video presently being displayed.

SUMMARY

Systems and methods are described herein for presenting relevant and timely social chatter by a featured person in a live video. For example, if a live broadcast of an award ceremony, such as the Academy Awards, is being displayed, and a celebrity, such as Leonardo DiCaprio is depicted in a corresponding live video, the systems and methods described herein may present relevant and timely social chatter by Leonardo DiCaprio. Timely and relevant social chatter may be social chatter initiated by Leonardo DiCaprio immediately before, during, or immediately after the Academy Awards were filmed, and may be filtered to only include thoughts that are relevant to the Academy Awards ceremony.

Systems and methods are also provided herein for providing timely and relevant social chatter simultaneously with a live broadcast from persons who are closely related to a person of interest. For example, if a brother of a quarterback of a football team is viewing a football game that the quarterback is playing in, and the brother provides social chatter about the football game, this timely and relevant social chatter may be generated for display simultaneously with the broadcast of the football game.

Systems and methods are also provided herein for providing timely and relevant social chatter simultaneously with a live broadcast from a person of interest who is initially unknown. For example, if the identity of a person who has been zoomed in on in a live broadcast for ten seconds is not known, the systems and methods disclosed herein may crowd source the identity of the person by locating trending topics that occurred during or substantially near the time that the person was zoomed in on, and may interpolate the identity of the person therefrom.

To this end, in some aspects of the disclosure, control circuitry of a user equipment may execute a media guidance application that detects a person of interest being displayed in a live video. In some embodiments, the media guidance application, when detecting the person of interest being displayed in the live video, may determine that a person is present in the live video for a threshold amount of time. For example, if a person in an awards ceremony, such as the Academy Awards ceremony, is zoomed in on for five seconds, that person may be determined to be a person of interest. Thus, in response to determining that the person is present in the live video for the threshold amount of time, the media guidance application may designate the person as a person of interest.

In some embodiments, the media guidance application may identify an identity of the person of interest. For example, when identifying the identity of the person of interest, the media guidance application may capture an image of the face of the person of interest, identify distinguishing characteristics of the face of the person of interest using facial recognition technology, and compare the distinguishing characteristics to entries of a database, where each respective entry corresponds a respective profile of a person to distinguishing characteristics of a face of the respective person. Thus, using these facial recognition techniques, the media guidance application may ascertain the identity of the person based on a result of the comparing of the distinguishing characteristics to the entries of the database. Following from the example above, the media guidance application may thereby determine that Leonardo DiCaprio is the person of interest.

In some embodiments, the media guidance application may compare the identity of the person of interest to entries of a database of social media profiles. For example, when the media guidance application is comparing the identity of the person of interest to entries of the database of social media profiles, the media guidance application may first identify a social media platform, where the database corresponds to the social media platform. For example, Twitter, a well-known social media platform, may be identified or selected, and thus the searching to be described below may occur on Twitter's databases.

The media guidance application may then search the database for a profile corresponding to the identity of the person of interest (e.g., by searching the name "Leonardo DiCaprio" through Twitter's database), and may receive a plurality of results. For example, the results may include people named Leonardo with a different last name from DiCaprio, or spoof accounts that pretend to be Leonardo DiCaprio.

In some embodiments, the media guidance application may identify, based on the comparing, a social media component that corresponds to the person of interest. In the example above, where a plurality of results are received from the searching, the media guidance application may identify a single result of the plurality of results as the social media component. For example, the media guidance application may compare additional attributes of the person of interest to content of each respective result of the plurality of results (e.g., the fact that Leonardo DiCaprio is an actor, his age, etc.), and may identify a highest matching result of the plurality of results based on the comparing of the additional attributes to the content of each respective result of the plurality of results and designate the highest matching result as the single result.

In some embodiments, the media guidance application may determine whether the person of interest has modified the social media component within a predefined period of time. For example, the media guidance application may determine whether the user updated his or her social media component during the live broadcast. In some embodiments, this determination may include identifying a time stamp corresponding to modification of the social media component, determining whether the time stamp is within the predefined period of time of when the person of interest was detected in the live video, and, in response to determining that the time stamp is within the predefined period of time when the person of interest was detected in the live video, determining that the person of interest has modified the social media component within the predefined period of time.

In some embodiments, the media guidance application may, in response to determining that the person of interest has modified the social media component within a predefined period of time, provide information relating to a modification of the social media component simultaneously with the live video. For example, if Leonardo DiCaprio updated a social media component he maintains on the social media platform Twitter, this update may be generated for display simultaneously with the Academy Award broadcast.

In some embodiments, the media guidance application may determine, prior to providing the information relating to the modification of the social media c component simultaneously with the live video, whether the modification of the social media component is relevant to the live video. For example, if, during the Academy Award ceremony described above, Leonardo DiCaprio provides a social media update to his Twitter page that solely relates to his dog, the modification may be deemed to be not relevant because it does not bear on the live broadcast video. Thus, the media guidance application may, in response to determining that the modification of the social media component is relevant to the live video, proceed to provide the information relating to the modification of the social media component simultaneously with the live video and may, in response to determining that the modification of the social media component is not relevant to the live video, refrain from proceeding to provide the information relating to the modification of the social media component simultaneously with the live video.

In some embodiments, the media guidance application, when determining whether the modification of the social media component is relevant to the live video, may compare data of the modification to data associated with the live video, such as the live video's title. The media guidance application may determine whether the data of the modification matches the data associated with the live video (e.g., does Leonardo DiCaprio's social media update mention the Academy Awards?), and, in response to determining that the data of the modification matches the data associated with the live video, may determine that the modification of the social media component is relevant to the live video. Likewise, the media guidance application may, in response to determining that the data of the modification does not match the data associated with the live video, determine that the modification of the social media component is not relevant to the live video.

In some embodiments, the media guidance application may continue to monitor the social media component of the person of interest for further modifications for the duration of a broadcast of the live video. For example, Leonardo DiCaprio's social media component on Twitter may be monitored for further updates throughout the live broadcast of the Academy Awards. The media guidance application may provide the further modifications simultaneously with the live video when the further modifications are detected.

In some embodiments, the media guidance application, when providing the further modifications simultaneously with the live video when the further modifications are detected, may determine whether the further modifications are relevant to the live video, and may, in response to determining that the further modifications are relevant to the live video, provide the further modifications simultaneously with the live video when the further modifications are detected. Likewise, the media guidance application may, in response to determining that the further modifications are not relevant to the live video, refrain from providing the further modifications simultaneously with the live video when the further modifications are detected.

In some aspects of the disclosure, systems and methods are provided for presenting relevant and timely social chatter by a person who is closely related to a featured person in a video. In a similar manner as described above, a media guidance application executed by control circuitry of a user equipment may detect a person of interest being displayed in a live video, may identify an identity of the person of interest, and may access a profile of the person of interest.

In some embodiments, the media guidance application may identify, based on the profile, a plurality of persons who are closely related to the person of interest. For example, the media guidance application may, when identifying, based on the profile, the plurality of persons who are closely related to the person of interest, first identify, from the profile, persons with whom the person of interest has interacted with within a threshold period of time (e.g., persons with whom the person of interest has exchanged telephone calls with, SMS messages, social media exchanges, and the like). The media guidance application may then designate the identified persons as the plurality of persons who are closely related to the person of interest.

In some embodiments, the media guidance application may identify a subset of the plurality of persons who are geographically proximate to a location where the live video is being filmed. For example, the media guidance application may, when identifying the subset, compare the identities of each person of the subset to entries of a database of social media profiles. The media guidance application may then identify, based on the comparing, respective social media components that correspond to each person of the subset, and may determine whether a respective person of the subset has modified his or her respective social media component within a predefined period of time. In response to determining that the person of the subset has modified his or her respective social media component within the predefined period of time, the media guidance application may provide information relating to a modification of the respective social media component simultaneously with the video. In this manner, updates may be limited to closely related persons to the person of interest who are actually in attendance at an event that is subject to the live video broadcast.

In some embodiments, the media guidance application, when identifying the subset of the plurality of persons who are geographically proximate to the location where the live video is being filmed, may determine whether a respective global positioning system ("GPS") device that is operated by a respective person of the plurality of persons indicates that the respective person is proximate to the location where the live video is being film, and, in response to determining that the GPS device that is operated by the respective person of the plurality of person indicates that the respective person is proximate to the location where the live video is being filmed, the media guidance application may add the respective person to the subset.

In some embodiments, the media guidance application, when identifying a subset of the plurality of persons who are geographically proximate to a location where the live video is being filmed, may determine whether a respective person of the plurality of persons is captured in the live video, and may, in response to determining that the respective person of the plurality of persons is captured in the live video, add the respective person to the subset. For example, if the brother of an athlete who is playing in a sporting event that is being live-broadcast is attending the sporting event, the brother may be added to the subset so that his social media updates are generated for display with the video.

In some embodiments, the media guidance application may compare the identities of each person of the subset to entries of a database of social media profiles, and may identify, based on the comparing, respective social media components that corresponds to each person of the subset. The media guidance application may then determine whether a respective person of the subset has modified his or her respective social media component within a predefined period of time, and may, in response to determining that the person of the subset has modified his or her respective social media component within the predefined period of time, providing information relating to a modification of the respective social media component simultaneously with the video. Each of these operations of the media guidance application are described above and below with respect to the person of interest, and will thus not be again described with respect to persons of the subset for brevity.

In some embodiments, the media guidance application may continue to monitor the social media component of the person of the subset for further modifications for the duration of a broadcast of the live video. The media guidance application may then provide the further modifications simultaneously with the live video when the further modifications are detected.

In some aspects of the disclosure, systems and methods are provided herein for presenting relevant and timely social chatter by an unknown person of interest in a video. For example, if a person in a live video is zoomed in on for a threshold amount of time (e.g., 5 seconds), the person is likely a person of interest. That person may be unknown to some databases because that person is not a celebrity. Systems and methods are disclosed herein to identify the person (e.g., by way of crowdsourcing).

To this end, control circuitry of a user equipment may execute a media guidance application that detects that a person is displayed in a live video for a threshold amount of time, and may determine, based on the detecting, that the person is a person of interest. These elements may be performed in any manner described in further detail above and below.

In some embodiments, the media guidance application may attempt to identify an identity of the person of interest by comparing attributes of the person of interest to entries of a database. In some embodiments, when the media guidance application is attempting to identify an identity of the person of interest by comparing attributes of the person of interest to entries of a database, the media guidance application may capture an image of the face of the person of interest, and may identify distinguishing characteristics of the face of the person of interest using facial recognition technology. The media guidance application may then compare the distinguishing characteristics to the entries of the database, where each respective entry corresponds a respective profile of a person to distinguishing characteristics of a face of the respective person. The media guidance application may then seek a match between the distinguishing characteristics and data of the entries of the database.

In some embodiments, the media guidance application, when determining that the attempting has failed, may base the determining on an inability to match the attributes to any of the entries of the database. For example, if facial characteristics are unknown to the database, then the attempting may fail to yield a match. Thus, in some embodiments, the media guidance application may determine that the attempting has failed based on an inability to match the attributes to any of the entries of the database. In response to determining that the attempting has failed, the media guidance application may identify broadcast times corresponding to a period of time in which the person was displayed in the live video.

In some embodiments, the media guidance application may identify trending topics in a social media space that relate to the live video. For example, the media guidance application, when identifying the trending topics in the social media space that relate to the live video, may first identify a plurality of topics that have received a threshold amount of commentary during the broadcast times. The media guidance application may then compare attributes of the live video to attributes of the plurality of topics, and identify a topic of the plurality of topics that best matches the attributes of the live video.

In some embodiments, the media guidance application may ascertain an identity of the person of interest based on the trending topics. For example, the media guidance application, when ascertaining the identity of the person of interest based on the trending topics, may parse messages of the topic that best match the attributes of the live video for an indicia of the identity of the person of interest, and may determine the identity of the person of interest based on content of the parsed messages. For example, social media comments may be parsed for a common mentioned name of a person.

In some embodiments, the media guidance application may compare the identity of the person of interest to a database of social media profiles, may identify, based on the comparing, a social media component that corresponds to the person of interest, may determine whether the person of interest has modified the social media component within a predefined period of time, and, in response to determining that the person of interest has modified the social media component within a predefined period of time, may provide information relating to a modification of the social media component simultaneously with the video.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
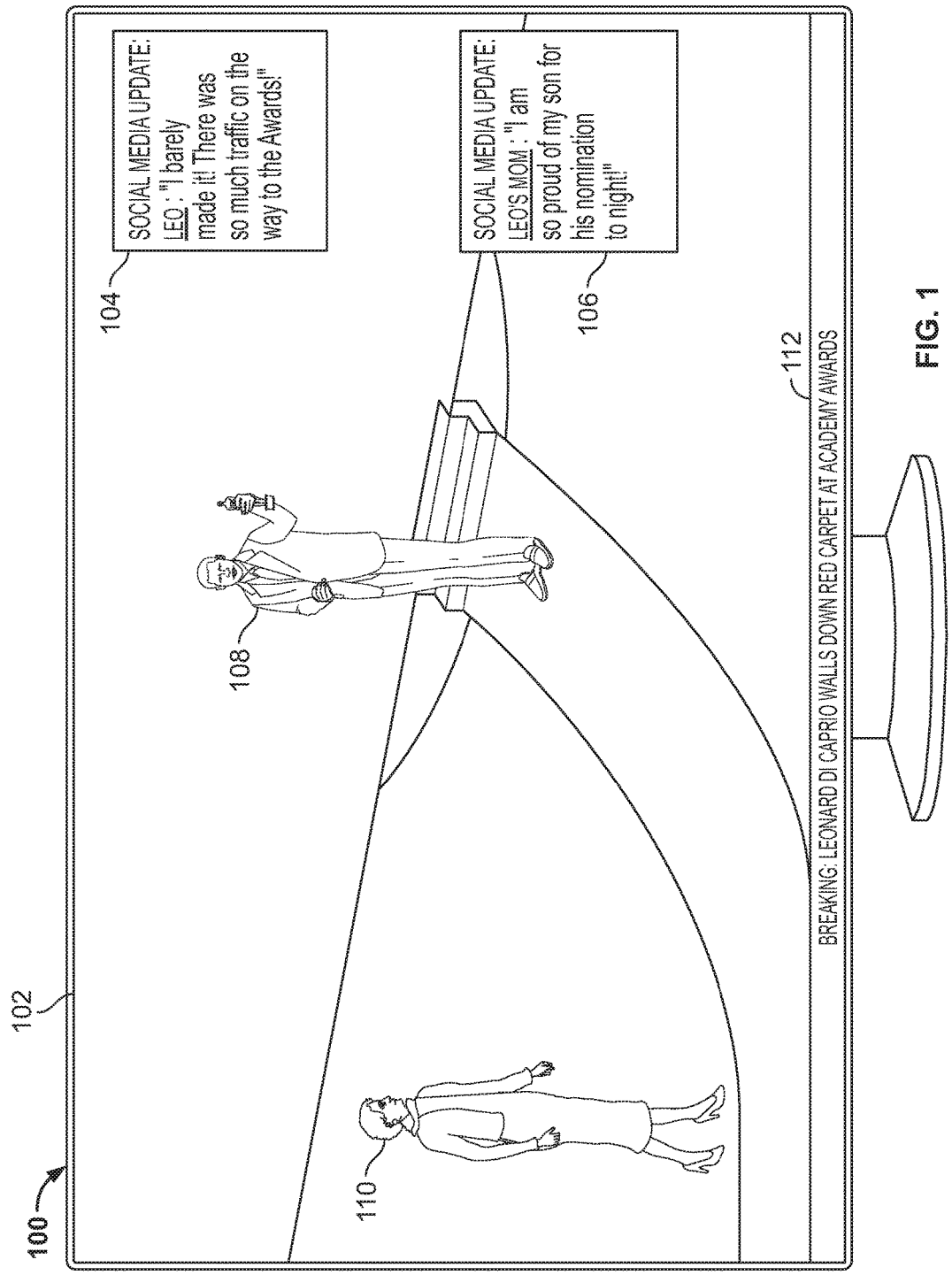
FIG. 1 depicts a user equipment that is generating for simultaneous display both a media asset and social media updates relating to the media asset, in accordance with some embodiments of the disclosure.

FIG. 1 depicts a user equipment that is generating for simultaneous display both a media asset and social media updates relating to the media asset, in accordance with some embodiments of the disclosure. FIG. 1 depicts user equipment 100, which may comprise control circuitry that executes a media guidance application. The functionality of user equipment, control circuitry, and the media guidance application is described in further detail below with respect to FIGS. 2-5. The media guidance application may generate for display media asset 102, which may be a live video broadcast. Media asset 102 may comprise live media, on-demand media, reruns, or any other linear or non-linear media, as is described in greater detail below with respect to FIGS. 2-5. Moreover, while the terms "live video," "live broadcast video," and the like are used throughout the specification, these uses are merely illustrative, and may be used interchangeably with any other media asset as defined here and with respect to FIGS. 2-5. While depicted as displayed on a display of user equipment 100, media asset 102 may be displayed on any other user equipment. Also depicted in FIG. 1 is social media update 104, social media update 106, person of interest 108, closely related person 110, and ticker 112, each of which will be described in greater detail in the paragraphs below.

In some aspects of the disclosure, the control circuitry of user equipment 100 may execute a media guidance application that detects a person of interest being displayed in a live video. For example, the media guidance application of user equipment 100 may detect person of interest 108. Person of interest 108 may be detected based on any emphasis of person 108, such as person 108 being in the foreground, person 108 being displayed for a sufficient period of time, person 108 being a celebrity, textual data corresponding to person 108 (e.g., ticker 112) being generated for display simultaneously with person 108, and the like. As will be described below, person of interest 108, after being identified, may be determined by the media guidance application to be or to not be a person of interest to a user of user equipment 100 based on the user's profile, and thus may be qualified or disqualified from being labeled a person of interest with respect to the user.

In some embodiments, the media guidance application, when detecting person of interest 108 in media asset 102 (which may be live video), may determine that person 108 is present in the live video for a threshold amount of time. For example, if a person in media asset 102, such as the Academy Awards ceremony, is zoomed in on for five seconds, that person may be determined to be a person of interest. Thus, in response to determining that the person is present in the live video for the threshold amount of time, the media guidance application may designate the person as person of interest 108.

In some embodiments, person 108 may be designated as a person of interest if a person is known to be a celebrity. For example, if facial recognition technology recognizes characteristics of person of interest 108 as corresponding to characteristics of a celebrity, the person may be designated as person of interest 108. Similarly, if textual data indicates that a person is a celebrity, the person may be designated as person of interest 108.

In some embodiments, the media guidance application may identify an identity of person of interest 108. Any known means of identifying the identity of a person in media asset 102 may be used. For example, facial recognition techniques (described further below), relying on auxiliary information (e.g., textual information displayed in media asset 102 or VBI information or other metadata associated with media asset 102), and the like may be used to identify the identity of person of interest 108.

In some embodiments, when identifying the identity of person of interest 108, the media guidance application may capture an image of the face of person of interest 108. For example, the media guidance application may parse out a frame of media asset 102 where the face of person of interest 108 is particularly prominent. The media guidance application may identify distinguishing characteristics of the face of person of interest 108 using facial recognition technology. For example, the media guidance application may identify eye color, hair color, skin color, and the like of person 108.

The media guidance application may then compare the distinguishing characteristics to entries of a database, where each respective entry corresponds a respective profile of a person to distinguishing characteristics of a face of the respective person. For example, the media guidance application may search for a database entry that reflects a person with a combination of different distinguishing characteristics that was captured from person of interest 108's face. Thus, using these facial recognition techniques, the media guidance application may ascertain the identity of the person based on a result of the comparing of the distinguishing characteristics to the entries of the database. Following from the example above, the media guidance application may thereby determine that Leonardo DiCaprio is the person of interest.

In some embodiments, the media guidance application may compare the identity of person of interest 108 to entries of a database of social media profiles. The term identity, as used herein, refers to any identifying feature of a person. For example, the person's name, likeness, distinguishing facial characteristics, telephone number, address, and the like, and any combination or portion thereof, may be referred to by the term identity.

In some embodiments, when the media guidance application is comparing the identity of the person of interest to entries of the database of social media profiles, the media guidance application may first identify a social media platform, where the database corresponds to the social media platform. For example, Twitter, a well-known social media platform, may be identified or selected, and thus the searching to be described below may occur on Twitter's databases. The database may correspond to any known social media platform, or may correspond to an aggregation of several known social media platforms. Database functionality is discussed in further detail below with respect to FIGS. 2-5.

The media guidance application may then search the database for a profile corresponding to the identity of the person of interest, and may receive a plurality of results. For example, the name "Leonardo DiCaprio" may be searched, or an image of Leonardo DiCaprio's face may directly be used to search for a match. Following the example of the name "Leonardo DiCaprio" being searched, the results may include people named Leonardo with a different last name from DiCaprio, or people with the last name DiCaprio who do not have the first name Leonardo, or spoof accounts that pretend to be Leonardo DiCaprio, or the like.

In some embodiments, the media guidance application may identify, based on the comparing, a social media component that corresponds to the person of interest. The term "social media component," as used herein, refers to a personal space that a user curates or maintains on a social media platform. For example, a social media platform such as FaceBook or Instagram may enable a user to maintain a "wall" or "space" where the user can add text, pictures, and other media. Any user-customizable area offered by a social media platform is within the scope of the term "social media component." For example, the best match or highest ranked match in the searching may be determined to be a social media component (e.g., a FaceBook page, where FaceBook is a well-known social media platform) of person of interest 108. In some embodiments, the media guidance application may determine the social media component of person of interest 108 by detecting indicia that the social media platform has verified the identity of the person who owns the social media component. For example, some social media platforms like FaceBook and Twitter allow celebrity users to verify their identity directly with the company in order to ensure that the celebrity's account is not being spoofed by a malicious user, and this indicia may be detectable by the media guidance application.

In some embodiments, when a plurality of results are received from the searching, the media guidance application may identify a single result of the plurality of results as the social media component. For example, the media guidance application may not be able to definitively resolve which result of a plurality of results from searching "Leonardo DiCaprio" is truly a social media component by the celebrity Leonardo DiCaprio. The media guidance application thus may compare additional attributes of person of interest 108 (e.g., age, eye color, interests, etc.) to content of each respective result of the plurality of results (e.g., the fact that Leonardo DiCaprio is an actor, his age, etc.), and may identify a highest matching result of the plurality of results based on the comparing of the additional attributes to the content of each respective result of the plurality of results and designate the highest matching result as the single result.

In some embodiments, after person of interest 108 is identified, the media guidance application may determine whether the user of user equipment 100 cares to learn of social media updates relating to person of interest 108. For example, the media guidance application may compare information of the user's profile to information about the identity of person of interest 108. On the basis of this comparison, the media guidance application may determine that the user does like, or does not like, person of interest 108. If the media guidance application determines that the user does like person of interest 108, the media guidance application may proceed to provide social media update 104 to the user. If the media guidance application determines that the user does not like person of interest 108, the media guidance application may disqualify person of interest 108 as a person of interest, and may refrain from generating for display social media update 104 about person of interest 108.

In some embodiments, the media guidance application may determine whether person of interest 108 has modified the social media component within a predefined period of time. The media guidance application may, for example, determine whether person of interest 108 updated his or her social media component within a few hours of a live broadcast of media asset 102 (either before or after the live broadcast). The media guidance application may monitor the social media component of person of interest 108 for updates during the predetermined period of time. As used herein the predefined period of time (or similarly, a threshold amount of time) refers to an amount of time that is defaulted to, set by an editor at a content provider, or set by a user. This predefined time, when reached, is used to trigger a corresponding action, which is described in connection with the predefined period of time or threshold. In this case, the predefined period time, when reached, triggers a determination that a social media component's modification is timely with respect to a live broadcast of media asset 102.

In some embodiments, the media guidance application may determine that during a live broadcast of media asset 102, person of interest 108 accesses a user equipment (e.g., a smartphone, a smart watch, or a tablet). The media guidance application may query the social media component upon detecting such access to determine whether person of interest 108 was modifying his or her social media component when accessing his or her user equipment.

In some embodiments, the media guidance application may determine whether the user updated his or her social media component during the live broadcast by identifying a time stamp corresponding to modification of the social media component. For example, the media guidance application may identify that Leonardo DiCaprio updated his Twitter page at 8:04 pm. The media guidance application may then determine whether the time stamp is within the predefined period of time of when the person of interest was detected in the live video (e.g., during a broadcast time of the Academy Awards, which is broadcast from 7:00 pm to 11:00 pm). The media guidance application may, in response to determining that the time stamp is within the predefined period of time when the person of interest was detected in the live video, determine that person of interest 108 (e.g., Leonardo DiCaprio) has modified the social media component within the predefined period of time.

In some embodiments, the media guidance application may, in response to determining that the person of interest has modified the social media component within a predefined period of time, provide information relating to a modification of the social media component simultaneously with the live video. For example, if Leonardo DiCaprio updated a social media component he maintains on the social media platform Twitter during the broadcast of the Academy Awards, social media update 104 may be generated for display simultaneously with the Academy Award broadcast. Social media update 104 may include any textual, video, photographic, audio, or other multimedia data that originated with person of interest 108. Social media update 104 may comprise multiple social media updates, or may dynamically update as person of interest 108 continues to modify his or her social media component. In some embodiments, person of interest 108 may change over time, or there may be multiple persons of interest 108, and thus social media update 104 may include multiple social media updates, and the multiple social media updates may be from multiple persons of interest 108.

In some embodiments, the media guidance application may determine, prior to providing the information relating to the modification of the social media component simultaneously with the live video (e.g., social media update 104), whether the modification of the social media component is relevant to the live video. If social media update 104 comprises textual data, the media guidance application may compare the textual data to metadata of media asset 102 (e.g., determine whether there is a match between words of the textual data nad the metadata). For example, if, during the Academy Award ceremony described above, Leonardo DiCaprio provides a social media update to his Twitter page that states "I barely made it! There was so much traffic on the way to the Awards!," the media guidance application may detect that the word "Awards" matches the title "Academy Awards," and thus may determine that the social media update is relevant and should thus be populated in social media update 104.

As a contrary example, the media guidance application may detect a social media modification that solely relates to Leonardo DiCaprio's dog, and may thus determine that the modification is not relevant because it does not bear on the live broadcast video. Thus, the media guidance application may, in response to determining that the modification of the social media component is relevant to the live video, proceed to provide the information relating to the modification of the social media component simultaneously with the live video and may, in response to determining that the modification of the social media component is not relevant to the live video, refrain from proceeding to provide the information relating to the modification of the social media component simultaneously with the live video.

In some embodiments, the media guidance application may continue to monitor the social media component of person of interest 108 for further social media updates 104 for the duration of a broadcast of the live video. For example, the media guidance application may continue to monitor Leonardo DiCaprio's social media component on Twitter for further updates throughout the live broadcast of the Academy Awards. In order to perform the monitoring, the media guidance application may periodically query the social media platform to learn whether any further social media update 104 has been received. Alternatively, the social media platform may push social media update 104 to user equipment 100 upon receiving further social media updates from person of interest 108. The media guidance application may generate for display the further modifications simultaneously with the live video (e.g., by way of social media update 104) when the further modifications are detected.

In some embodiments, the media guidance application may, when providing social media update 104 simultaneously with the live video when the further modifications are detected, determine whether the further modifications are relevant to the live video, and may, in response to determining that the further modifications are relevant to the live video, provide the further modifications simultaneously with the live video when the further modifications are detected. The media guidance application may determine relevance in any manner described above or below. Likewise, the media guidance application may, in response to determining that the further modifications are not relevant to the live video, refrain from providing the further modifications simultaneously with the live video when the further modifications are detected.

In some aspects of the disclosure, systems and methods are provided for presenting relevant and timely social chatter by a person who is closely related to a featured person in a video. For example, closely related person 110 may be closely related to person of interest 108. As used in this disclosure, a closely related person, such as closely related person 110, is deemed to be closely related to person of interest 108 if closely related person 110 has a sufficient relationship with person of interest 108. A sufficient relationship may be familial. The media guidance application may determine whether the relationship is sufficient based on data of a database, such as indicia of familial status, of friendship (e.g., on a social media platform), indicia of chatter between person of interest 108 and closely related person 110 (e.g., by way of SMS, MMS, social media chatter, and the like), and the like. Determining relationships between parties is described in further detail in U.S. Pat. No. 8,753,185, issued on Jul. 17, 2014, the disclosure of which is hereby incorporated by reference herein in its entirety.

In some embodiments, the media guidance application may identify, based on the profile, a plurality of persons who are closely related to person of interest 108. For example, in some embodiments, media asset 102 may involve a person of interest 108 who is not capable of providing social media update 104. Person of interest 108, may, e.g., be an athlete who is playing a sport, and thus does not have access to user equipment. Thus, the social media component modification of closely related person 110 may instead be used to populate social media updates (e.g., by way of social media update 106). Social media update 106 operates in substantially the same manner as social media update 104, but is provided from closely related person 110 instead of person of interest 108.

In some embodiments, in order to choose closely related person 110, the media guidance application may identify a subset of the people who are closely related to person of interest 108 who are geographically proximate to a location where media asset 102 is being filmed. For example, the media guidance application may determine whether a respective global positioning system ("GPS") device that is operated by a person who is closely related to person of interest 108 indicates that the person is proximate to the location where the live video is being film, and, in response to determining that the GPS device that is operated by the respective person of the plurality of person indicates that the respective person is proximate to the location where the live video is being filmed, the media guidance application may add the respective person to the subset. Thus, the media guidance application may determine a subset of closely related persons to person of interest 108 who also are proximate to person of interest 108.

The media guidance application may then compare the identities of each person of the subset to entries of a database of social media profiles. The media guidance application may then identify, based on the comparing, respective social media components that correspond to each person of the subset, and may determine whether a respective person of the subset has modified his or her respective social media component within a predefined period of time. This comparing may be performed in a similar manner to that described with respect to person of interest 108 above and below. In response to determining that the person of the subset has modified his or her respective social media component within the predefined period of time, the media guidance application may designate that person a closely related person 110, and may provide information relating to a modification of the respective social media component simultaneously with the video (e.g., by way of social media update 106).

In some embodiments, the media guidance application may identify closely related person 110 using facial recognition technology (e.g., similar to that described above). The media guidance application may perform facial recognition on persons captured by the video of media asset 102, for example, and may determine an identity of a given captured person using the processes and systems described above. The media guidance application may then determine whether a given captured person is a person closely related to person of interest 108 based on the identity, also using the systems and processes described above.

In some embodiments, the media guidance application may not have processing power to identify each person captured in media asset 102. Thus, the media guidance application may reduce its processing burden by limiting the number of detected persons whom it will identify. The media guidance application may, for example, limit its identification processes to persons who are depicted continuously for a minimum threshold of time (e.g., 3 seconds), and may only determine whether people depicted for that threshold are closely related to person of interest 108.

Alternatively, or additionally, the media guidance application may limit the number of persons for whom facial processing is performed by initiating facial recognition processes when certain conditions are present. For example, in a sporting event, it is likelier that a person who is closely related to an athlete playing in the sporting event is sitting in premium seating. Thus, the media guidance application may limit facial recognition processing for the purposes of determining a closely related person to person of interest 108 to persons seated in premium seating. Any logical condition may be set to trigger facial processing, and any combination of conditions may be set as well.

In some embodiments, the media guidance application may compare the identities of each person of the subset to entries of a database of social media profiles, may identify, based on the comparing, respective social media components that corresponds to each closely related person 110, may determine whether a respective closely related person has modified his or her respective social media component within a predefined period of time, and may, in response to determining that the person of the subset has modified his or her respective social media component within the predefined period of time, provide social media update 106 simultaneously with the video. Each of these operations of the media guidance application are described above and below with respect to person of interest 108, and will thus not be again described with respect to persons of the subset for brevity.

In some embodiments, the media guidance application may continue to monitor the social media component of closely related person 110 for further modifications for the duration of a broadcast of media asset 102. The media guidance application may then continually provide social media update 106 simultaneously with the live video when further modifications of a social media component of closely related person 110 occur. All other activities described in the foregoing that occur with respect to person of interest 108 equally apply to closely related person 110.

In some aspects of the disclosure, systems and methods are provided herein for presenting relevant and timely social chatter by an unknown person of interest in a video. For example, if a person in a live video is zoomed in on for a threshold amount of time (e.g., 5 seconds), the person is likely a person of interest. That person may be unknown to some databases because that person is not a celebrity. Systems and methods are disclosed herein to identify the person (e.g., by way of crowdsourcing).

To this end, control circuitry of a user equipment may execute a media guidance application that detects that a person is displayed in a live video (e.g., media asset 102) for a threshold amount of time, and may determine, based on the detecting, that the person is a person of interest (e.g., person of interest 108). These elements may be performed in any manner described above and below.

In some embodiments, the media guidance application may attempt to identify an identity of person of interest 108 by comparing attributes of the person of interest to entries of a database (through, e.g., the operations described above and below). In some embodiments, when the media guidance application is attempting to identify an identity of person of interest 108 by comparing attributes of the person of interest to entries of a database, the media guidance application may capture an image of the face of person of interest 108, and may identify distinguishing characteristics of the face of the person of interest using facial recognition technology. The media guidance application may then compare the distinguishing characteristics to the entries of the database, where each respective entry corresponds a respective profile of a person to distinguishing characteristics of a face of the respective person. The media guidance application may then seek a match between the distinguishing characteristics and data of the entries of the database. This may be performed by any system or process described above and below.

In some embodiments, the media guidance application may determine that there is no match when trying to identify person of interest 108, as the media guidance application may fail to match the attributes to any of the entries of the database. In such a circumstance, the media guidance application may conclude that person of interest 108 is unknown to the databases the media guidance application has access to. Thus, the media guidance application may turn to alternative sources to learn the identity of person of interest 108, such as crowdsourcing, as will be described below.

In some embodiments, the media guidance application may rely on crowdsourcing operations to identify the identity of person of interest 108. To this end, the media guidance application may identify trending topics in a social media space that relate to media asset 102. Trending topics, as used in this disclosure, are topics that are referred to or cited by a high number of users of social media platforms at a given point or period in time.

In some embodiments, the media guidance application, when identifying the trending topics in the social media space that relate to the live video, may first identify a plurality of topics that have received a threshold amount of commentary during the broadcast times (or near the broadcast times) of media asset 102. For example, if the Academy Awards was broadcast from 7:00 pm to 10:00 pm, the media guidance application may identify topics that were trending between 6:55 pm and 10:05 pm. The media guidance application may then compare attributes of media asset 102 to attributes of the plurality of topics, and identify a topic of the plurality of topics that best matches the attributes of the live video. For example, the media guidance application may compare metadata corresponding to media asset 102 (e.g., title, actors, participants, director, etc) to textual data of the topic and identify topics with textual data that at least partially match some metadata corresponding to media asset 102. These matching topics may be utilized to determine an identity of person of interest 108.

In some embodiments, the media guidance application may ascertain an identity of the person of interest based on the trending topics. For example, the media guidance application, when ascertaining the identity of the person of interest based on the trending topics, may parse messages corresponding to the topic that best match the attributes of the live video for an indicia of the identity of the person of interest, and may determine the identity of the person of interest based on content of the parsed messages. For example, social media comments may be parsed for a common mentioned name of a person. Following from the Academy Awards example, if messages commonly refer to the topic of "Awards" (e.g., by adding a hash tag next to the word Awards within the message (i.e., #Awards)), and if the messages correspond to a period of time that unknown person of interest 108 was broadcast (e.g., "wow I never thought I would see John Doe in the #Awards!"), then the media guidance application may be able to resolve that John Doe is person of interest 108.

In some embodiments, after person of interest 108 is identified, the media guidance application may compare the identity of person of interest 108 to a database of social media profiles, identify, based on the comparing, a social media component that corresponds to person of interest 108, determine whether person of interest 108 has modified the social media component within a predefined period of time, and, in response to determining that the person of interest has modified the social media component within a predefined period of time, provide social media update 104 simultaneously with the video, in any manner described above or below.

In some embodiments, media asset 102 may be a re-run or a broadcast of a non-live video. Systems and methods may be used to determine whether a person of interest 108 in media asset 102 is nonetheless generating social media update 104 that relates to media asset 102. For example, person of interest 108 may know that a movie that person of interest 108 acted in will be broadcast at a certain time, and may provide a running commentary on media asset 102 while it is broadcast, or may provide other related social media updates about media asset 102. These social media updates may appear as social media update 104.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
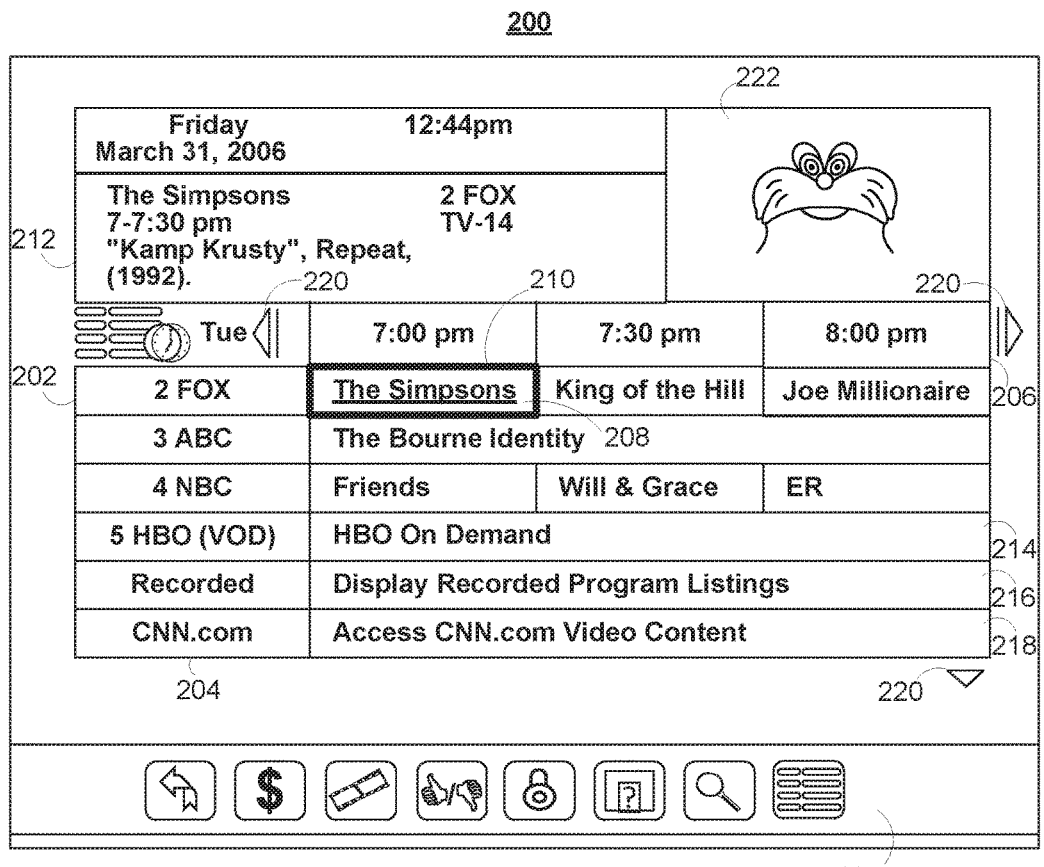
FIG. 2 shows an illustrative embodiment of a display screen that may be used to provide media guidance application listings and other media guidance information, in accordance with some embodiments of the disclosure.
Figure 3:
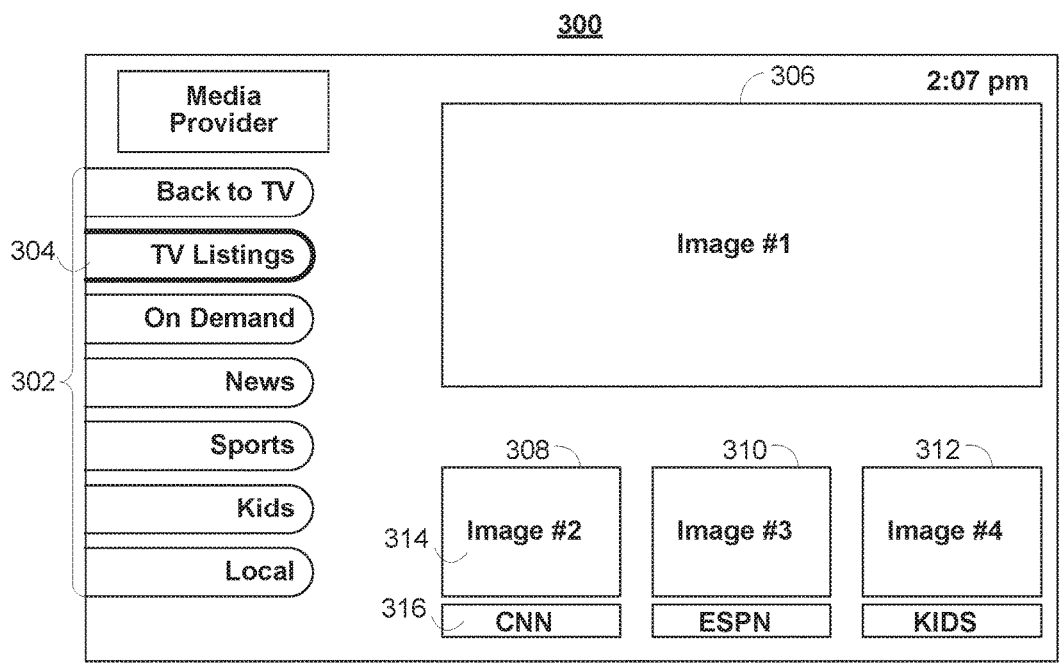
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
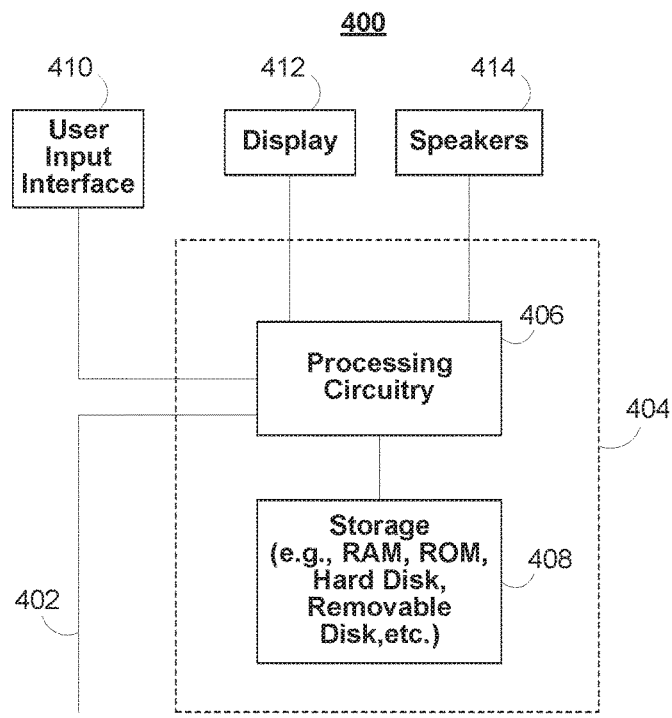
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
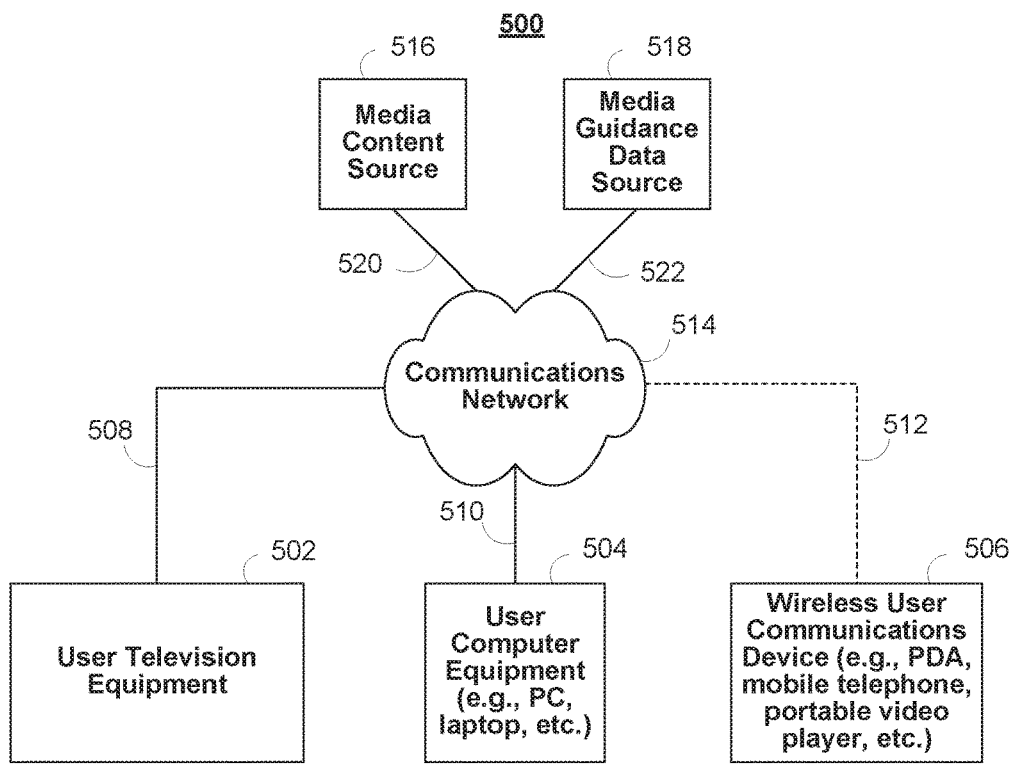
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
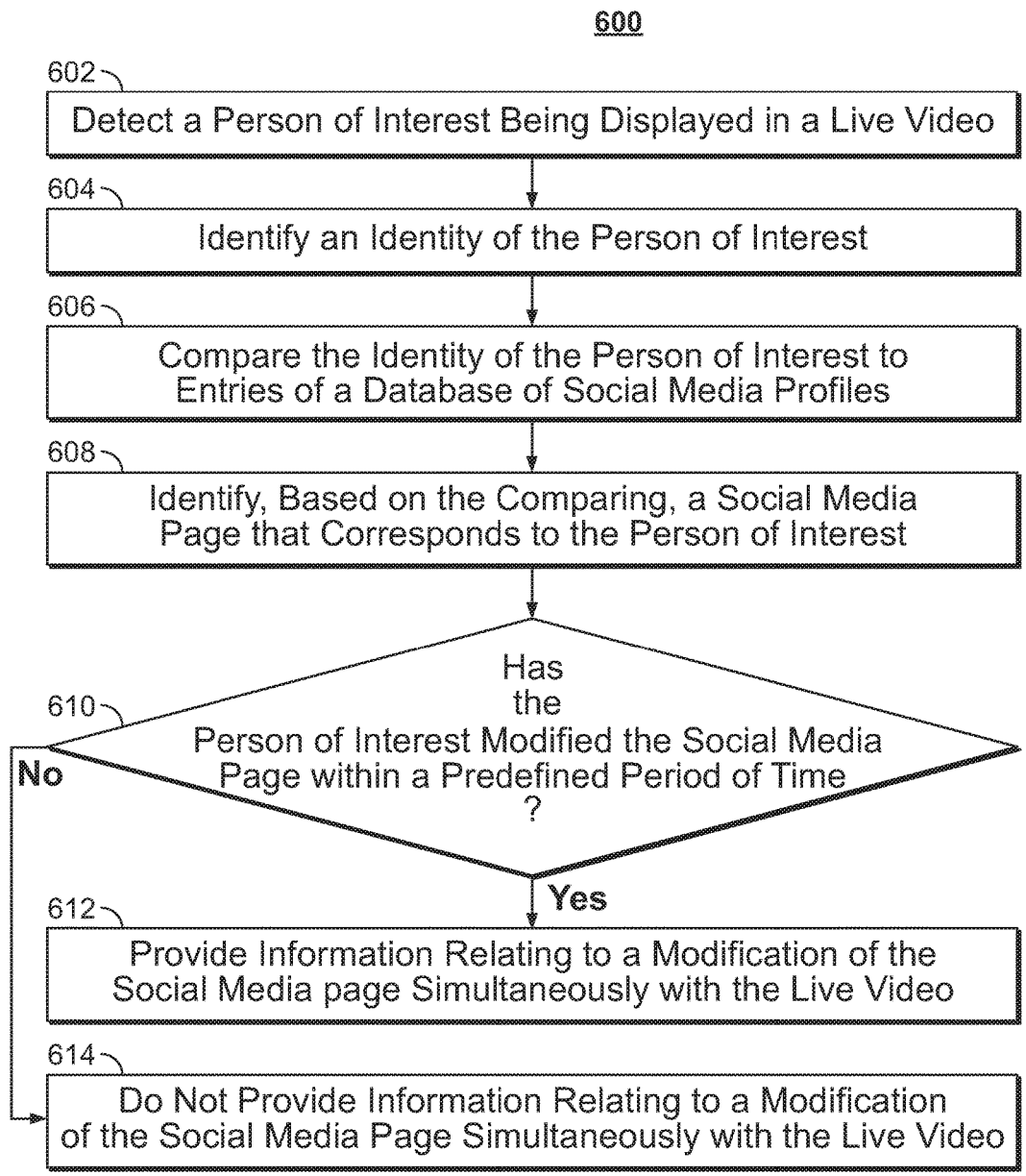
FIG. 6 is a flowchart of illustrative steps involved in providing social media updates from a person of interest in a live video, in accordance with some embodiments of the disclosure.

FIG. 6 is a flowchart of illustrative steps involved in providing social media updates from a person of interest in a live video, in accordance with some embodiments of the disclosure. Process 600 begins at 602, where control circuitry 404 of user equipment 100 may execute a media guidance application that detects a person of interest (e.g., person of interest 108) being displayed in a live video. User equipment 100 may have the same functionality as any or all of user television equipment 502, user computer equipment 504, and wireless user communications device 506. While FIG. 6 consistently refers to live video, this is merely illustrative, and any media asset 102 is replacing the term "live video" is contemplated in the scope of the disclosure. Media asset 102 may be displayed by way of display 412 of user equipment 100. The manner in which person of interest 108 may be detected is described in the foregoing. For example, media asset 102 may be the Academy Awards, and person of interest 108 may be Leonardo DiCaprio, who may be determined to be a person of interest because the cameras focused on him for a sufficient amount of time.

Process 600 may continue to 604, where the media guidance application may identify an identity of the person of interest (e.g., by any manner described above or below). For example, the media guidance application may identify that the person of interest is Leonardo DiCaprio. Process 600 may then continue to 606, where the media guidance application may compare the identity of person of interest 108 to entries of a database of social media profiles. The database (and any other database described herein) may be stored locally to user equipment 100 (e.g., on storage 408 of user equipment 100) or remote from user equipment 100 (e.g., at media guidance data source 518 or media content source 516, either of which are accessible by way of communications network 514).

Process 600 may then continue to 608, where the media guidance application may identify, based on the comparing, a social media component that corresponds to the person of interest. For example, the media guidance application may identify Leonardo DiCaprio's Twitter page or FaceBook page.

Process 600 may continue to 610, where the media guidance application may determine whether the person of interest has modified his or her social media component within a predefined period of time. For example, the media guidance application may determine whether Leonardo DiCaprio updated his Facebook page during the broadcast of the Academy Awards. If such a modification was made, process 600 may continue to 612, and if such a modification was not made, process 600 may continue to 614.

At 612, the media guidance application may provide information relating to a modification of the social media component simultaneously with the live video (e.g., the media guidance application may generate for display social media update 104). At 614, the media guidance application may refrain from providing information relating to a modification of the social media component simultaneously with the live video.

Figure 7:
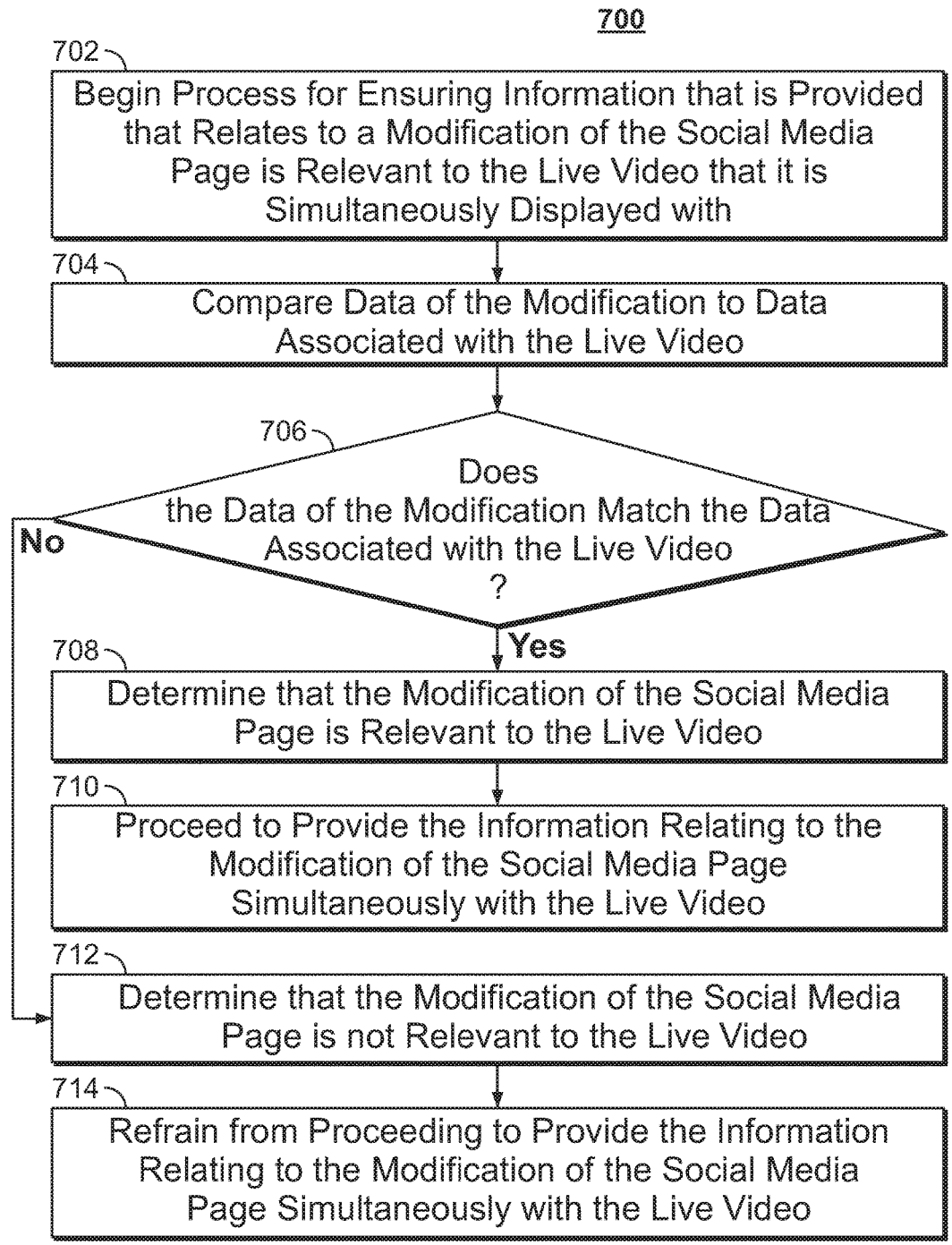
FIG. 7 is a flowchart of illustrative steps for ensuring that social media updates that are provided with live video are relevant to the live video, in accordance with some embodiments of the disclosure.

FIG. 7 is a flowchart of illustrative steps for ensuring that social media updates that are provided with live video are relevant to the live video, in accordance with some embodiments of the disclosure (e.g., in accordance with the elements of process 600). Process 700 begins at 702, where the media guidance application may begin a process for ensuring information that is provided that relates to a modification of the social media component is relevant to the live video that it is simultaneously displayed with. Process 700 continues to 704, where the media guidance application may compare data of the modification to data associated with the live video. For example, the media guidance application may parse textual data of a social media component modification by Leonardo DiCaprio that says "I barely made it! There was so much traffic on the way to the Awards!" and may compare each word of the textual data to, e.g., metadata associated with the Academy Awards, such as the title.

Process 700 may continue to 706, where the media guidance application determines whether the data of the modification match the data associated with the live video. For example, following from the example of 704, the media guidance application may determine that there is a match, because both the textual data and the title of media asset 102 have the word "Awards." If there is a match, process 700 may continue to 708, where the media guidance application may determine that the modification of the social media component is relevant to the live video. Process 700 may then continue to 710, where the media guidance application may proceed to provide the information relating to the modification of the social media component simultaneously with the live video (e.g., may generate for display social media update 104). If, however, there is no match, process 700 may continue to 712, where the media guidance application may determine that the modification of the social media component is not relevant to the live video, and may continue to 714, where the media guidance application may refrain from proceeding to provide the information relating to the modification of the social media component simultaneously with the live video.

Figure 8:
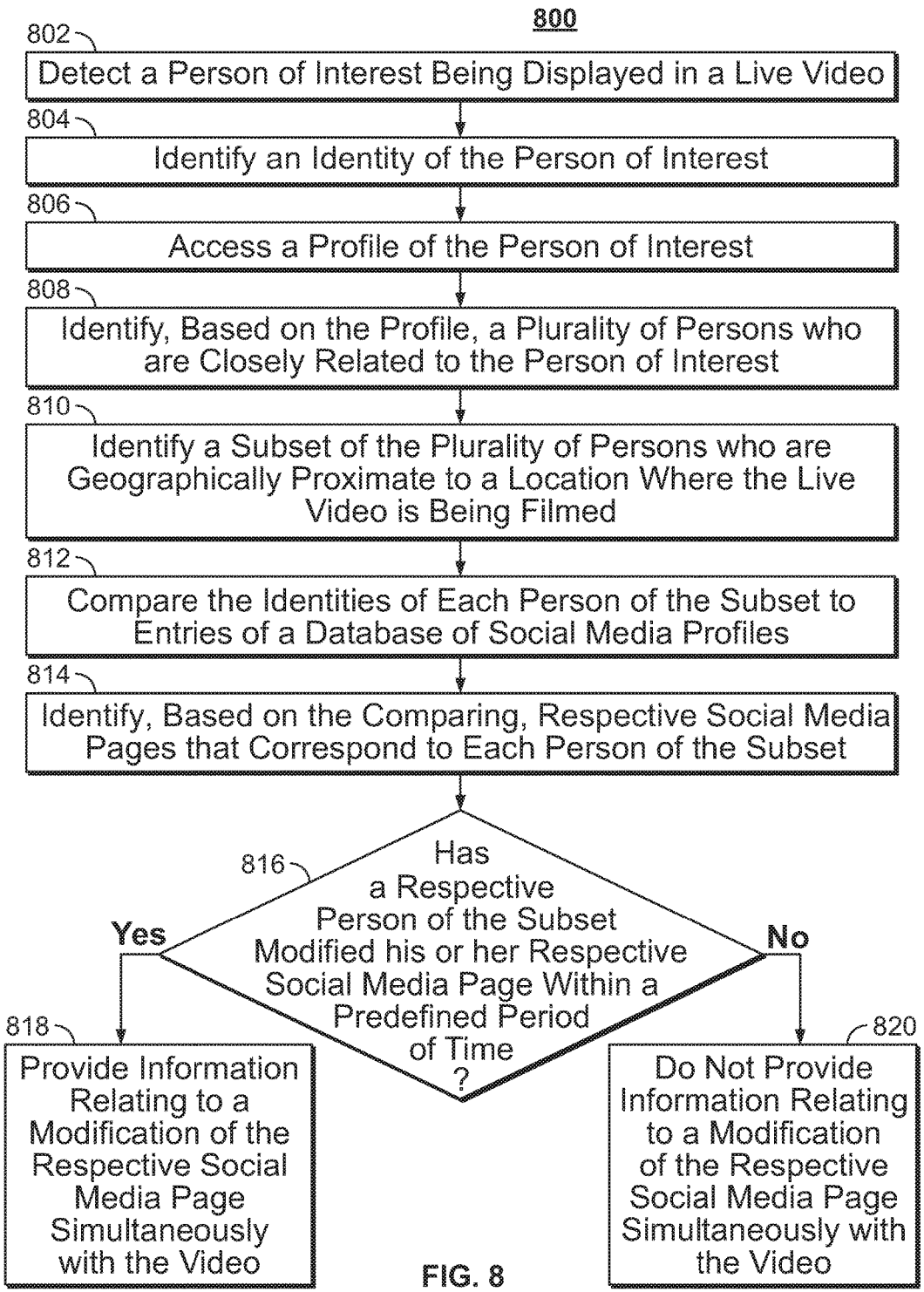
FIG. 8 is a flowchart of illustrative steps involved in providing social media updates from a person who is closely related to a person of interest of a live video, in accordance with some embodiments of the disclosure.

FIG. 8 is a flowchart of illustrative steps involved in providing social media updates from a person who is closely related to a person of interest of a live video, in accordance with some embodiments of the disclosure. Process 800 begins at 802, where the media guidance application may detect a person of interest being displayed in a live video. This may be performed in the same manner as 602. Process 800 may continue to 804, where the media guidance application may identify an identity of the person of interest. 804 may be performed in the same manner as 604.

Process 800 may then continue to 806, where the media guidance application may access a profile of the person of interest. For example, if person of interest 108 is Leonardo DiCaprio, the media guidance application may access a profile of Leonardo DiCaprio (e.g., a social media profile corresponding to a social media profile, or a different, broader profile that profiles activities, interests, and the likes of the user). This is described in further detail in the foregoing.

Process 800 may continue to 808, where the media guidance application may identify, based on the profile, a plurality of persons who are closely related to the person of interest. For example, the media guidance application may identify Leonardo DiCaprio's family members based on the profile. This may be performed in any manner described in the foregoing.

Process 800 may continue to 810, where the media guidance application may identify a subset of the plurality of persons who are geographically proximate to a location where the live video is being filmed. For example, the media guidance application may determine that Leonardo DiCaprio's mother and sister are present at the Academy Awards, and this may be determined in any manner described in the foregoing.

Process 800 may continue to 812, where the media guidance application may compare the identities of each person of the subset to entries of a database of social media profiles, and then to 814, where the media guidance application may identify, based on the comparing, respective social media components that corresponds to each person of the subset. For example, the media guidance application may identify Leonardo DiCaprio's mother's FaceBook page, and Leonardo DiCaprio's Twitter page, based on the comparison.

Process 800 may then continue to 816, where the media guidance application may determine whether a respective person of the subset has modified his or her respective social media component within a predefined period of time. For example, the media guidance application may determine that Leonardo DiCaprio's mother has modified her FaceBook page. If the media guidance application determines that someone (closely related person 110) has in fact updated his or her respective social media component within the predefined period of time, process 800 may continue to 818, where the media guidance application may provide information relating to a modification of the respective social media component (e.g., social media update 106) simultaneously with the video. If, however, the media guidance application determines that no one has updated a respective social media component within the predefined period of time, process 800 may continue to 820, where the media guidance application may refrain from providing information relating to a modification of the respective social media component simultaneously with the video.

Figure 9:
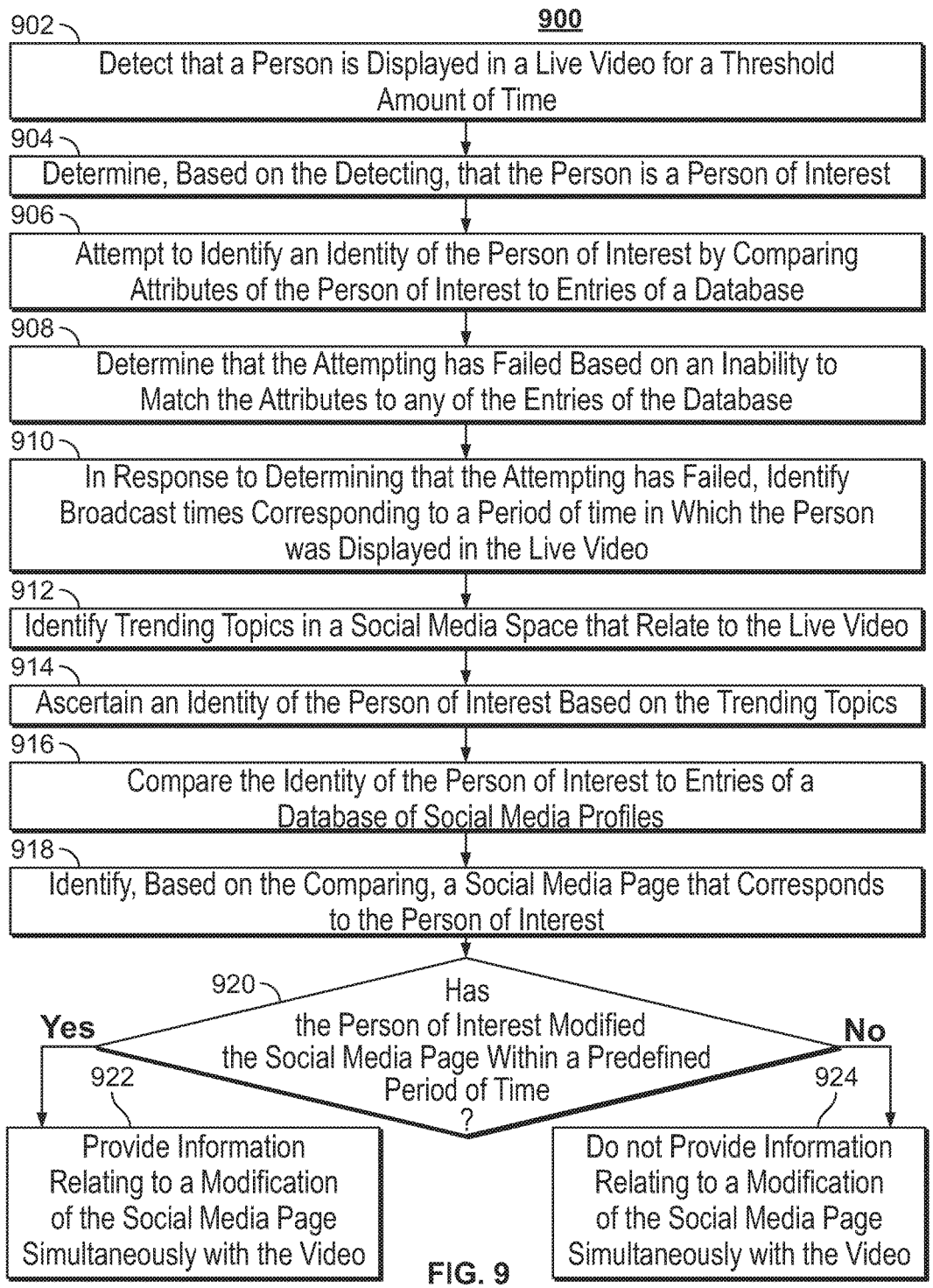
FIG. 9 is a flowchart of illustrative steps involved in resolving who a person of interest is when the person of interest is unknown to a database, and then providing social media updates from the person of interest, in accordance with some embodiments of the disclosure.

FIG. 9 is a flowchart of illustrative steps involved in resolving who a person of interest is when the person of interest is unknown to a database, and then providing social media updates from the person of interest, in accordance with some embodiments of the disclosure. Process 900 begins at 902, where the media guidance application may detect that a person is displayed in a live video for a threshold amount of time. This may be performed in a manner consistent with 602.

Process 900 may then continue to 904, where the media guidance application may determine, based on the detecting, that the person is a person of interest. For example, process 900 may determine that person of interest 108 has been zoomed in on in the broadcast of media asset 102 for a threshold period of time. Process 900 may then continue to 906, where the media guidance application may attempt to identify an identity of the person of interest by comparing attributes of the person of interest to entries of a database. As this attempt may fail, at 908, the media guidance application may determine that the attempting has failed based on an inability to match the attributes to any of the entries of the database.

At 910, the media guidance application may, in response to determining that the attempting has failed, identify broadcast times corresponding to a period of time in which the person was displayed in the live video. For example, the media guidance application may determine that media asset 102 is the Academy Awards, which was broadcast from 7:00 pm to 10:00 pm.

Process 900 may continue to 912, where the media guidance application may identify trending topics in a social media space that relate to the live video. For example, the topic "Awards," as indicated by a hash tag (e.g, "#Awards"). Process 900 may continue to 914, where the media guidance application may ascertain an identity of the person of interest based on the trending topics. For example, the media guidance application may determine that messages including the topic "Awards" at the time in which the unknown person of interest 108 was displayed in media asset 102 often refer to a person "John Doe." The media guidance application may determine therefrom that John Doe is the person of interest.

Process 600 may continue to 916, where the media guidance application may compare the identity of the person of interest to a database of social media profiles, and then to 918, where the media guidance application may identify, based on the comparing, a social media component that corresponds to the person of interest. Process 900 may then continue to 920, where the media guidance application may determine whether the person of interest has modified the social media component within a predefined period of time. If the determination is in the affirmative, process 900 may continue to 922, and if the determination is in the negative, process 900 may proceed to 924. At 922, the media guidance application may provide information relating to a modification of the social media component simultaneously with the video, and at 924, the media guidance application may refrain from providing information relating to a modification of the social media component simultaneously with the video. Elements 916-924 correspond to elements 606-614 of process 600 and thus may be executed consistent with the manner described with respect to process 600.

Figure 10:
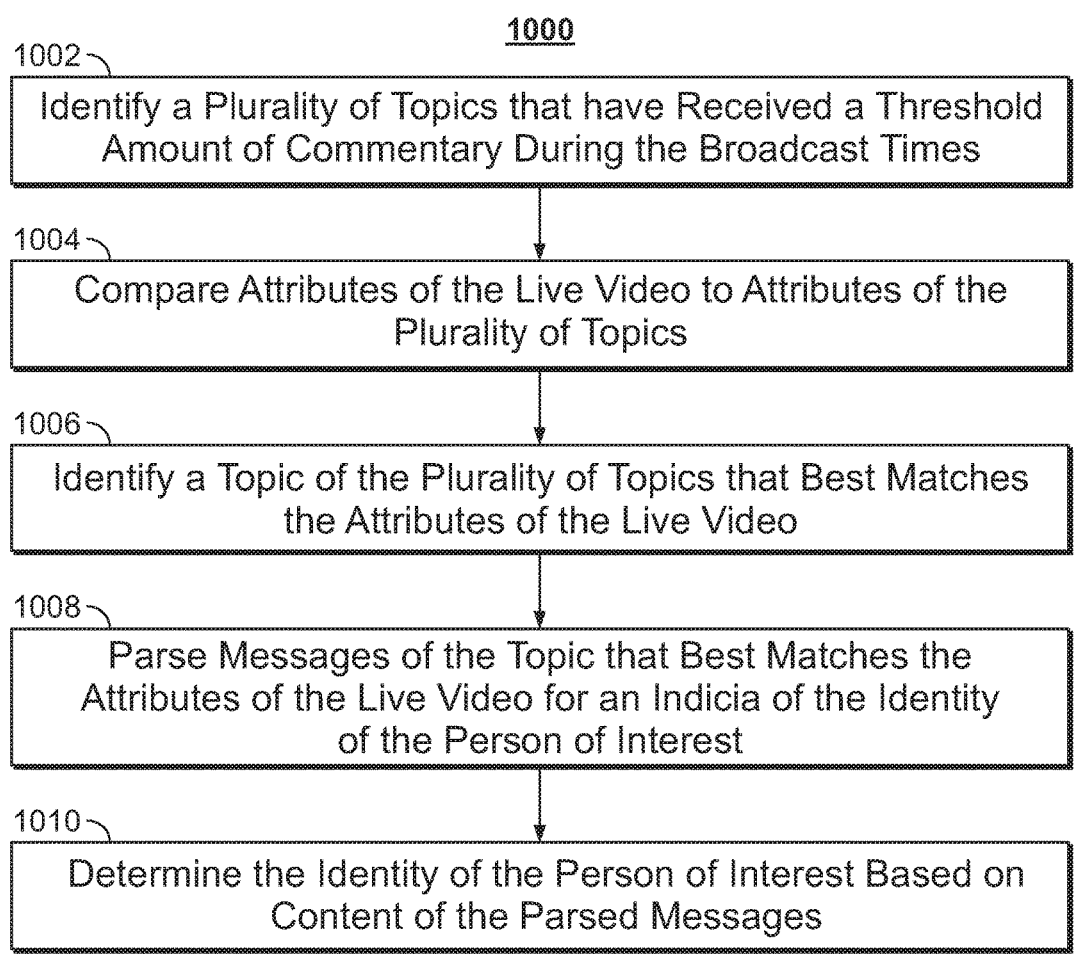
FIG. 10 is a flowchart of illustrative steps involved in resolving who an unknown person of interest is based on trending topics that are associated with a live video, in accordance with some embodiments of the disclosure.

FIG. 10 is a flowchart of illustrative steps involved in resolving who an unknown person of interest is based on trending topics that are associated with a live video, in accordance with some embodiments of the disclosure. Process 1000 begins at 1002, where the media guidance application may identify a plurality of topics that have received a threshold amount of commentary during the broadcast times. For example, the media guidance application may only consider topics that have received at least 100,000 comments during the broadcast of the Academy Awards to reduce the amount of noise to be parsed through.

Process 1000 may continue to 1004, where the media guidance application may compare attributes of the live video to attributes of the plurality of topics. For example, textual data of the topic (e.g., #Award) may be compared to, e.g., a title of media asset 102 ("Academy Awards") to yield an affirmative comparison. Process 1000 may continue to 1006, where the media guidance application may identify a topic of the plurality of topics that best matches the attributes of the live video (e.g., "Awards").

Process 1000 may then continue to 1008, where the media guidance application may parse messages of the topic that best match the attributes of the live video for indicia of the identity of the person of interest. For example, the media guidance application may identify that John Doe was mentioned in many messages with the topic #Awards. Process 1000 may thus continue to 1010, where the media guidance application may determine the identity of the person of interest based on content of the parsed messages (e.g., determine that John Doe is person of interest 108).

It should be noted that processes 600-1000 or any step thereof could be performed on, or provided by, any of the devices shown in FIGS. 1 and 4-5. For example, any of processes 600-1000 may be executed by control circuitry 404 (FIG. 4) as instructed by control circuitry implemented on user equipment 502, 504, and/or 506 (FIG. 5) in order to ensure seamless access to restricted media. In addition, one or more steps of processes 600-1000 may be incorporated into or combined with one or more steps of any other process or embodiment.

It is contemplated that the steps or descriptions of each of FIGS. 6-10 may be used with any other embodiment of this disclosure. In addition, the steps and descriptions described in relation to FIGS. 6-10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-10.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, determining an identity of a person of interest may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update profile settings associated with a user, such as a user's favorite celebrities, stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention" or "related art," any such reference is merely for the purpose of providing context to the invention(s) of the instant disclosure, and does not form any admission as to what constitutes the state of the art.

What is claimed is:

1. A method for presenting relevant and timely social chatter by an unknown person of interest in a video, the method comprising:

detecting, using control circuitry, that a person is displayed in a live video for a threshold amount of time;

determining, using the control circuitry, based on the detecting, that the person is a person of interest;

attempting, using the control circuitry, to identify an identity of the person of interest by comparing attributes of the person of interest to entries of a database;

determining, using the control circuitry, that the attempting has failed based on an inability to match the attributes to any of the entries of the database;

in response to determining that the attempting has failed, identifying, using the control circuitry, broadcast times corresponding to a time in which the person was displayed in the live video;

identifying, using the control circuitry, trending topics in a social media space during the broadcast times;

ascertaining, using the control circuitry, the identity of the person of interest based on the trending topics;

comparing, using the control circuitry, the identity of the person of interest to a database of social media profiles;

identifying, using the control circuitry, based on the comparing, a social media component belonging to the person of interest;

determining, using the control circuitry, whether the social media component belonging to the person of interest has been modified within a predefined period of time; and in response to determining that the social media component belonging to the person of interest has been modified within the predefined period of time, providing, using communications circuitry, information relating to a modification of the social media component simultaneously with the live video.

2. The method of claim 1, wherein attempting to identify an identity of the person of interest by comparing attributes of the person of interest to entries of a database comprises:

capturing an image of the face of the person of interest;

identifying distinguishing characteristics of the face of the person of interest using facial recognition technology;

comparing the distinguishing characteristics to the entries of the database, wherein each respective entry corresponds a respective profile of a person to distinguishing characteristics of a face of the respective person; and seeking a match between the distinguishing characteristics and data of the entries of the database.

3. The method of claim 1, wherein identifying the trending topics in the social media space that relate to the live video comprises:

identifying a plurality of topics that have received a threshold amount of commentary during the broadcast times;

comparing attributes of the live video to attributes of the plurality of topics; and identifying a topic of the plurality of topics that best matches the attributes of the live video.

4. The method of claim 3, wherein ascertaining the identity of the person of interest based on the trending topics further comprises:

parsing messages of the topic that best matches the attributes of the live video for an indicia of the identity of the person of interest; and determining the identity of the person of interest based on content of the parsed messages.

5. The method of claim 1, wherein comparing the identity of the person of interest to the database of social media profiles further comprises:

identifying a social media platform corresponding to the database of social media profiles;

searching the database of social media profiles for a profile corresponding to the identity of the person of interest; and receiving a plurality of results, wherein identifying, based on the comparing, the social media component belonging to the person of interest comprises identifying a single result of the plurality of results as the social media component.

6. The method of claim 5, wherein identifying the single result of the plurality of results as the social media component comprises:

comparing additional attributes of the person of interest to content of each respective result of the plurality of results;

identifying a highest matching result of the plurality of results based on the comparing of the additional attributes to the content of each respective result of the plurality of results; and designating the highest matching result as the single result.

7. The method of claim 1, wherein determining whether the social media component belonging to the person of interest has been modified within the predefined period of time comprises:

identifying a time stamp corresponding to the modification of the social media component;

determining whether the time stamp is within the predefined period of time of when the person of interest was detected in the live video; and in response to determining that the time stamp is within the predefined period of time when the person of interest was detected in the live video, determining that the social media component belonging to the person of interest has been modified within the predefined period of time.

8. The method of claim 1, wherein the method further comprises:

determining, prior to providing the information relating to the modification of the social media component simultaneously with the live video, whether the modification of the social media component is relevant to the live video;

in response to determining that the modification of the social media component is relevant to the live video, proceeding to provide the information relating to the modification of the social media component simultaneously with the live video; and in response to determining that the modification of the social media component is not relevant to the live video, refraining from proceeding to provide the information relating to the modification of the social media component simultaneously with the live video.

9. The method of claim 8, wherein determining whether the modification of the social media component is relevant to the live video comprises:

comparing data of the modification to data associated with the live video;

determining whether the data of the modification matches the data associated with the live video;

in response to determining that the data of the modification matches the data associated with the live video, determining that the modification of the social media component is relevant to the live video; and in response to determining that the data of the modification does not match the data associated with the live video, determining that the modification of the social media component is not relevant to the live video.

10. A system for presenting relevant and timely social chatter by an unknown person of interest in a video, the system comprising:

communications circuitry; and control circuitry configured to:

detect that a person is displayed in a live video for a threshold amount of time;

determine, based on the detecting, that the person is a person of interest;

attempt, using the communications circuitry, to identify an identity of the person of interest by comparing attributes of the person of interest to entries of a database;

determine that the attempting has failed based on an inability to match the attributes to any of the entries of the database;

in response to determining that the attempting has failed, identify broadcast times corresponding to a time in which the person was displayed in the live video;

identify trending topics in a social media space during the broadcast times;

ascertain the identity of the person of interest based on the trending topics;

compare the identity of the person of interest to a database of social media profiles;

identify, based on the comparing, a social media component belonging to the person of interest;

determine whether the social media component belonging to the person of interest has been modified within a predefined period of time; and in response to determining that the social media component belonging to the person of interest has been modified within a predefined period of time, provide information relating to a modification of the social media component simultaneously with the live video.

11. The system of claim 10, wherein the control circuitry is further configured to attempt to identify an identity of the person of interest by comparing attributes of the person of interest to entries of a database by:

capturing an image of the face of the person of interest;

identifying distinguishing characteristics of the face of the person of interest using facial recognition technology;

comparing the distinguishing characteristics to the entries of the database, wherein each respective entry corresponds a respective profile of a person to distinguishing characteristics of a face of the respective person; and seeking a match between the distinguishing characteristics and data of the entries of the database.

12. The system of claim 11, wherein the control circuitry is further configured to determine that the attempting has failed based on an inability to match the attributes to any of the entries of the database by making the determination on the basis of a failure to yield a match during the seeking.

13. The system of claim 10, wherein the control circuitry is further configured to identify the trending topics in the social media space that relate to the live video by:
    identifying a plurality of topics that have received a threshold amount of commentary during the broadcast times;
    comparing attributes of the live video to attributes of the plurality of topics; and
    identifying a topic of the plurality of topics that best matches the attributes of the live video.

14. The system of claim 13, wherein the control circuitry is further configured to ascertain the identity of the person of interest based on the trending topics by:
    parsing messages of the topic that best matches the attributes of the live video for an indicia of the identity of the person of interest; and
    determining the identity of the person of interest based on content of the parsed messages.

15. The system of claim 10, wherein the control circuitry is further configured to compare the identity of the person of interest to the database of social media profiles by:
    identifying a social media platform corresponding to the database of social media profiles;
    searching the database of social media profiles for a profile corresponding to the identity of the person of interest; and
    receiving a plurality of results, wherein
    the control circuitry is further configured to identify, based on the comparing, the social media component belonging to the person of interest by identifying a single result of the plurality of results as the social media component.

16. The system of claim 15, wherein the control circuitry is further configured to identify the single result of the plurality of results as the social media component by:
    comparing additional attributes of the person of interest to content of each respective result of the plurality of results;
    identifying a highest matching result of the plurality of results based on the comparing of the additional attributes to the content of each respective result of the plurality of results; and
    designating the highest matching result as the single result.

17. The system of claim 10, wherein the control circuitry is further configured, when determining whether the social media component belonging to the person of interest has been modified within the predefined period of time, to:
    identifying a time stamp corresponding to the modification of the social media component;
    determining whether the time stamp is within the predefined period of time of when the person of interest was detected in the live video; and
    in response to determining that the time stamp is within the predefined period of time when the person of interest was detected in the live video, determining that the social media component belonging to the person of interest has been modified within the predefined period of time.

18. The system of claim 10, wherein the control circuitry is further configured to:
    determine, prior to providing the information relating to the modification of the social media component simultaneously with the live video, whether the modification of the social media component is relevant to the live video;
    in response to determining that the modification of the social media component is relevant to the live video, proceed to provide the information relating to the modification of the social media component simultaneously with the live video; and
    in response to determining that the modification of the social media component is not relevant to the live video, refrain from proceeding to provide the information relating to the modification of the social media component simultaneously with the live video.

19. The system of claim 18, wherein the control circuitry is further configured to determine whether the modification of the social media component is relevant to the live video by:
    comparing data of the modification to data associated with the live video;
    determining whether the data of the modification matches the data associated with the live video;
    in response to determining that the data of the modification matches the data associated with the live video, determining that the modification of the social media component is relevant to the live video; and
    in response to determining that the data of the modification does not match the data associated with the live video, determining that the modification of the social media component is not relevant to the live video.

20. A method for presenting relevant and timely social chatter by an unknown person of interest in a video, the method comprising:
    identifying, using control circuitry, broadcast times corresponding to time in which a person of interest was displayed in a live video;
    identifying, using the control circuitry, trending topics in a social media space during the broadcast times;
    ascertaining, using the control circuitry, an identity of the person of interest based on the trending topics;
    comparing, using the control circuitry, the identity of the person of interest to a database of social media profiles;
    identifying, using the control circuitry, based on the comparing, a social media component belonging to the person of interest;
    determining, using the control circuitry, the social media component belonging to the person of interest has been modified within a predefined period of time; and
    in response to determining that the social media component belonging to the person of interest has been modified within the predefined period of time, providing, using communications circuitry, information relating to a modification of the social media component simultaneously with the live video.

* * * * *